US010986365B2

(12) United States Patent
Chen et al.

(10) Patent No.: US 10,986,365 B2
(45) Date of Patent: **\*Apr. 20, 2021**

(54) METHOD OF ADAPTIVE INTERPOLATION FILTERING IN VIDEO CODING

(71) Applicant: MEDIATEK INC., Hsinchu (TW)

(72) Inventors: Ching-Yeh Chen, Taipei (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/396,838

(22) Filed: Apr. 29, 2019

(65) Prior Publication Data

US 2019/0253731 A1     Aug. 15, 2019

Related U.S. Application Data

(63) Continuation of application No. 15/126,365, filed as application No. PCT/CN2015/075649 on Apr. 1, 2015, now Pat. No. 10,321,151.

(Continued)

(51) Int. Cl.
*H04N 19/523* (2014.01)
*H04N 19/105* (2014.01)
(Continued)

(52) U.S. Cl.
CPC ......... *H04N 19/523* (2014.11); *H04N 19/105* (2014.11); *H04N 19/117* (2014.11);
(Continued)

(58) Field of Classification Search
CPC .. H04N 19/523; H04N 19/583; H04N 19/105; H04N 19/117
See application file for complete search history.

(56) References Cited

U.S. PATENT DOCUMENTS

| 8,737,481 B2 | 5/2014 | Lee et al. |
| 9,172,972 B2 | 10/2015 | Chong et al. |

(Continued)

FOREIGN PATENT DOCUMENTS

| CN | 1666429 A | 9/2005 |
| CN | 1720747 A | 1/2006 |

(Continued)

OTHER PUBLICATIONS

Karczewicz, M., et al.; "A Hybrid Video Codec Based on Extended Block Sizes, Recursive Integer Transforms, Improved Interpolation, and Flexible Motion Representation;" Visual Information Processing and Communication II; Jan. 2011; pp. 1-15.

(Continued)

*Primary Examiner* — Rowina J Cattungal
(74) *Attorney, Agent, or Firm* — Oblon, McClelland, Maier & Neustadt, L.L.P.

(57) ABSTRACT

A method and apparatus provide adaptive interpolation filter for motion compensation with fractional-pixel accuracy. Embodiments of the present invention generate interpolated reference samples at non-integer locations based on existing reference samples in a reference block by using an interpolation filter set adaptively according to pixel location and/or pixel characteristics. A current block is then encoded or decoded using a temporal predictor including the interpolated reference samples. The adaptive interpolation filter can be applied to the prediction unit (PU). In one embodiment, the interpolation filter set consists of interpolation filters having different filter lengths. An interpolation filter with a longer tap length is applied to generate interpolated reference samples farther from the block boundary and an interpolation filter with a shorter tap length is applied to generate interpolated reference samples closer to the block boundary.

12 Claims, 5 Drawing Sheets

Related U.S. Application Data

(60) Provisional application No. 61/973,407, filed on Apr. 1, 2014.

(51) Int. Cl.
*H04N 19/583* (2014.01)
*H04N 19/82* (2014.01)
*H04N 19/167* (2014.01)
*H04N 19/117* (2014.01)
*H04N 19/182* (2014.01)
*H04N 19/96* (2014.01)
*H04N 19/174* (2014.01)
*H04N 19/176* (2014.01)

(52) U.S. Cl.
CPC ......... *H04N 19/167* (2014.11); *H04N 19/182* (2014.11); *H04N 19/583* (2014.11); *H04N 19/82* (2014.11); *H04N 19/96* (2014.11); *H04N 19/174* (2014.11); *H04N 19/176* (2014.11)

(56) References Cited

U.S. PATENT DOCUMENTS

| | | | |
|---|---|---|---|
| 9,277,247 B2 | 3/2016 | Alshin et al. | |
| 2008/0175322 A1 | 7/2008 | Lee et al. | |
| 2009/0180539 A1 | 7/2009 | Kudana et al. | |
| 2009/0245374 A1 | 10/2009 | Hsu et al. | |
| 2012/0069906 A1 | 3/2012 | Sato | |
| 2012/0170650 A1* | 7/2012 | Chong | H04N 19/129 375/240.12 |
| 2012/0250773 A1* | 10/2012 | Chien | H04N 19/70 375/240.26 |
| 2013/0044814 A1* | 2/2013 | Guo | H04N 19/593 375/240.12 |
| 2013/0128974 A1* | 5/2013 | Chien | H04N 19/583 375/240.15 |
| 2013/0170554 A1 | 7/2013 | Matsuo et al. | |
| 2013/0182780 A1* | 7/2013 | Alshin | H04N 19/86 375/240.29 |
| 2015/0217357 A1* | 8/2015 | Tomaru | B21D 24/06 72/350 |
| 2015/0237358 A1* | 8/2015 | Alshin | H04N 19/43 375/240.16 |
| 2015/0237359 A1* | 8/2015 | Alshin | H04N 19/635 375/240.16 |
| 2016/0007032 A1* | 1/2016 | Alshina | H04N 19/59 375/240.02 |

FOREIGN PATENT DOCUMENTS

| | | |
|---|---|---|
| CN | 101547354 A | 9/2009 |
| CN | 101641960 A | 2/2010 |
| CN | 101778280 A | 7/2010 |
| CN | 102668568 A | 9/2012 |
| CN | 102714731 A | 10/2012 |
| CN | 102804779 A | 11/2012 |
| CN | 103037219 A | 4/2013 |
| CN | 103119940 A | 5/2013 |
| CN | 103238320 A | 8/2013 |
| CN | 103339939 A | 10/2013 |
| WO | WO 2011/096770 A3 | 8/2011 |

OTHER PUBLICATIONS

Sullivan, G.J.; "Multi-Hypothesis Motion Compensation for Low Bit-Rate Video Coding;" IEEE; Apr. 1993; pp. V-437-V-440.

Lopes, F.J.P., et al.; "Analysis of spatial transform motion estimation with overlapped compensation and fractional-pixel accuracy;" IEE Proc.-Vis. Image Signal Process; vol. 146; No. 6; Dec. 1999; pp. 339-344.

Tao,B., et al.; "Joint application of overlapped block motion compensation and loop filtering for low bit-rate video coding;" IEEE; Oct. 1997; pp. 626-629.

Combined Chinese Office Action and Search Report dated Oct. 30, 2020 in Patent Application No. 201910516048.0 (with English translation of Category of Cited Documents), citing documents AO-AS therein, 9 pages.

\* cited by examiner

METHOD OF ADAPTIVE INTERPOLATION FILTERING IN VIDEO CODING

CROSS REFERENCE TO RELATED APPLICATIONS

The present invention is a Continuation of pending U.S. patent application Ser. No. 15/126,365, filed on Sep. 15, 2016, which is a National Phase of pending PCT Application No. PCT/CN2015/075649, filed on Apr. 1, 2015, which claims priority to U.S. Provisional Patent Application, Ser. No. 61/973,407, filed on Apr. 1, 2014. The present invention is also related to PCT Patent Application, Serial No. PCT/CN2014/093148, filed on Dec. 5, 2014. The U.S. Provisional Patent Application and the PCT Patent Application are hereby incorporated by reference in their entireties.

TECHNICAL FIELD

The present invention relates to video signal processing. In particular, the present invention relates to adaptive interpolation filtering for motion compensation in video coding.

BACKGROUND

In video coding systems utilizing Motion Estimation (ME)/Motion Compensation (MC) with fractional pixel accuracy, interpolation is required to derive reference pixels at fractional pixel locations. For example, 8-tap and 4-tap DCT-based (Discrete Cosine Transform based) interpolation filter sets for fractional motion compensation have been adopted in H.265/HEVC video coding standard for luma and chroma components, respectively. An example of 8-tap interpolation filter for motion compensation is shown in FIG. 1. The thick-lines box 110 corresponds to a current 8×8 block. The 8-tap filtering of the 8×8 block requires neighboring samples as indicated by the patterned area to perform the 8-tap filtering. The horizontal interpolation for samples at A, B and C are indicated by thick-lined small squares. A group of fractional samples associated with each existing sample (i.e., integer-pel location) are generated when the fractional motion vector is allowed. For example, interpolated samples at ¼-pel, ½-pel and ¾-pel locations will be generated if ¼-pel accuracy is used for the motion vector. The interpolation can be implemented using two separate one-dimensional filters in the vertical direction and the horizontal direction. For ¼-pel, ½-pel and ¾-pel locations, three filters with individual filter coefficients are used. As shown in FIG. 1, the total number of samples includes the current block and neighboring samples involved in interpolation filtering is 15×15=225. While the fixed interpolation filter set can be implemented with lower computation complexity or less hardware cost, however, the coding performance is not very good.

In order to improve the coding efficiency related to interpolation filter for fractional-pixel motion compensation, a method of adaptive interpolation filter (AIF) has been disclosed during the development of the HEVC standard. A region-based AIF (RNAIF) has been disclosed by Matsu, et al., in JCTVC-B051 (Region-based adaptive interpolation filter, Joint Collaborative Team on Video Coding (JCT-VC), of ITU-T SG16 WP3 and ISO/IEC JTC1/SC29/WG11, 2nd Meeting: Geneva, CH, 21-28 Jul. 2010. Document: JCTVC-B051). According to JCTVC-B051, a picture is divided into multiple regions and filter coefficients are optimized on a region-by-region basis. The region-based interpolation filter has been found to improve performance around 5% to 6% in BD-rate.

While various AIF methods have shown noticeable performance improvement, it is desirable to further improve the coding efficiency without increasing the required bandwidth.

SUMMARY

A method and apparatus of adaptive interpolation filter for motion compensation with fractional-pixel accuracy are disclosed. Embodiments of the present invention generate interpolated reference samples at non-integer locations based on existing reference samples in a reference block by using an interpolation filter set adaptively according to pixel location and/or pixel characteristics. A current block is then encoded or decoded using a temporal predictor including the interpolated reference samples. The adaptive interpolation filter can be applied to the prediction unit (PU).

In one embodiment, the interpolation filter set comprises a longer-tap filter and a shorter-tap filter. In one example, the longer-tap filter is applied to generate a first interpolated reference sample, the shorter-tap filter is applied to generate a second interpolated reference sample, and the first interpolated reference sample is farther from a related block boundary than the second interpolated reference sample. In another example, the current blocks correspond to two adjacent blocks for overlapped motion compensation (OBMC), and the shorter-tap filter can be applied to generate the interpolated reference samples in an overlapped area between two adjacent blocks and the longer-tap filter can be applied to generate the interpolated reference samples in a non-overlapped area of two adjacent blocks. Furthermore, the shorter-tap filter may correspond to a 4-tap filter and the longer-tap filter may correspond to an 8-tap filter. In yet another example, the one or more current blocks may correspond to one current block for motion boundary enhancement (MBE). The shorter-tap filter can be applied to generate boundary interpolated reference samples of the current block and the longer-tap filter can be applied to generate the interpolated reference samples in the current block.

The current picture may be partitioned into multiple regions and an individual interpolation filter set is determined for each region. The region may correspond to one slice, one tile, one coding tree unit (CTU), one coding tree block (CTB), one coding unit (CU) or one prediction unit (PU). Information related to the individual interpolation filter set for each region can be signaled explicitly or derived implicitly at a decoder side. In the case of explicit signaling, a syntax element related to the individual interpolation filter set for each region can be signaled to indicate the individual interpolation filter set selected for a current region. In the case of implicit derivation, the information related to the individual interpolation filter set for each region can be derived at the decoder side based on coding unit (CU) size, prediction unit (PU) size, characteristic of reference pixels, prediction mode, motion vector, or any combination thereof.

DETAILED DESCRIPTION OF THE INVENTION

For interpolation, a filter with longer tap length usually can achieve better performance. However, a filter with a longer filter tap requires more computations as well as more data storage/access. For example, if a 4-tap interpolation filter is applied to an 8×8 block, the total number of samples involved will be 11×11=121. On the other hand, the total number of sample becomes 225 (=15×15) for an 8-tap filter. Embodiments of the present invention can increase the performance without increasing the data storage/access or reduce data storage/access without causing noticeable impact on the performance. Larger data storage for interpolation implies that a larger buffer will be required. On the other hand, more data access implies higher system bandwidth for data access.

Figure 1:
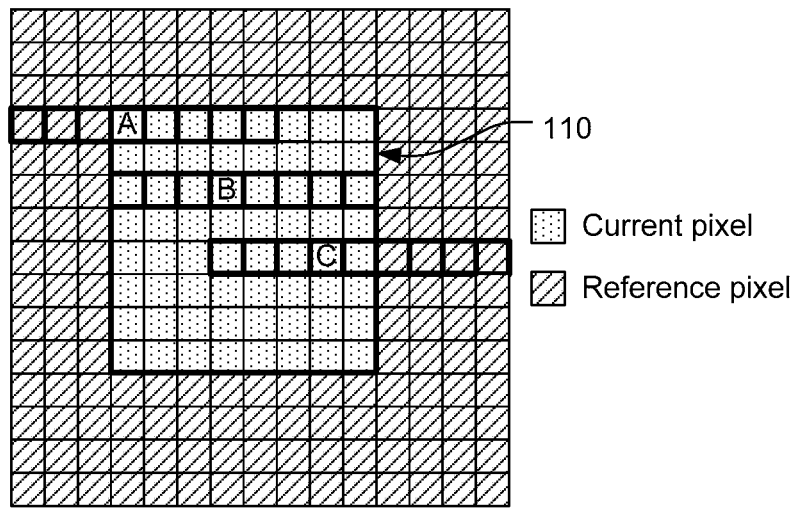
FIG. 1 illustrates an example of 8-tap interpolation filter for fractional-pixel motion compensation for an 8×8 block.
Figure 2:
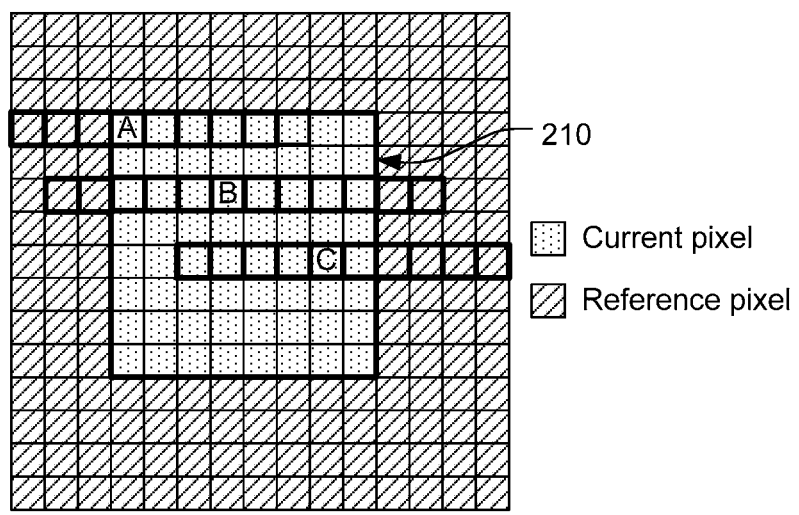
FIG. 2 illustrates an example of adaptive interpolation filter incorporating an embodiment of the present invention, where the filter tap length is increased for generating interpolated samples farther from the block boundary in order to improve coding performance.

For the conventional approach as shown in FIG. 1, the 8-tap interpolation filter set used by the HEVC standard needs a (3+8+4)×(3+8+4) reference block to perform motion compensation on one 8×8 current block (110). For each pixel in the current block, an 8×1 pixel row or 1×8 pixel column is used to perform 8-taps horizontal or vertical interpolation. However, as shown in FIG. 1, more than eight pixels can be used in the interpolation process for those internal pixels (i.e., non-block boundary pixels) of the current block. As an example shown in FIG. 2, with an 8×8 current block (210), a 10-tap interpolation filter can be used for sample C within the current block and a 12-tap interpolation filter can be used for sample B within the current block. If the pixel is farther from block boundaries of the current block, more pixels can be used in the interpolation process without the need of more reference samples than those already available in the conventional approach. Accordingly, embodiments of the present invention apply an interpolation filter set with a longer filter tap for these pixels to improve the coding performance.

Figure 3:
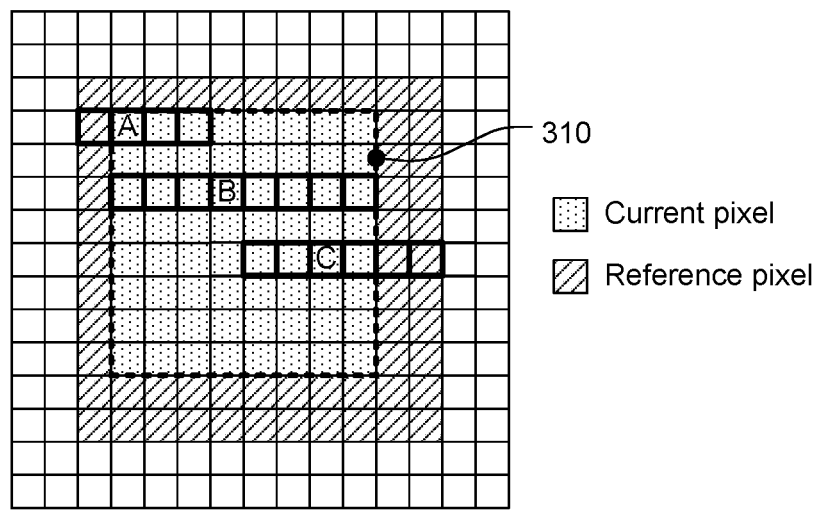
FIG. 3 illustrates another example of adaptive interpolation filter incorporating an embodiment of the present invention, where the filter tap length is shortened for generating interpolated samples closer to the block boundary in order to reduce required reference data.

As mentioned earlier, internal pixels have more pixels to use for interpolation without the need of more reference samples than those already available in the conventional approach. Accordingly, the above embodiment does not increase the required bandwidth while increasing filter tap length for internal samples. Another embodiment utilizes this characteristic to reduce the required bandwidth in motion compensation, as shown in FIG. 3. For those pixels closer to block boundaries (310) of the current block, an interpolation filter set with a shorter filter tap is applied to perform the interpolation process. For example, an 8-tap interpolation filter set is applied to sample B, a 6-Tap interpolation filter set is applied to sample C, and a 4-tap interpolation filter set is applied to sample A. Accordingly, the required total number of pixels to be access for one 8×8 current block is reduced from (3+8+4)×(3+8+4)=225 to (1+8+2)×(1+8+2)=121, where the reference pixels outside of the current block are indicated by slant lines in FIG. 3. In other words, a 46% bandwidth reduction is achieved for 8×8 block in motion compensation by applying an interpolation filter set with a short filter tap on those pixels close to block boundaries.

The adaptation of interpolation filter can also be based on pixel characteristics. The characteristics associated with one or more pixels can be determined and one or more interpolation filters can be selected according to the derived characteristics. The characteristics may correspond to the variance, edge direction or other known pixels characteristics known in the literature. Furthermore, the adaptation of interpolation filter can be based on both position and characteristics of the pixel.

During the development of HEVC, besides the fixed interpolation filter set, switching interpolation filters and offset (SIFO) have also been proposed. In SIFO, multiple interpolation filter sets can be used and switched at the slice level. This adaptation can achieve some localization to fit the characteristic of the video sequence and provide better coding efficiency. However, the required bandwidth and computational complexity depend on the selected interpolation filter set. The adaptation according to SIFO may not be sufficient since not all textures in one picture are similar. Therefore, another embodiment of the present invention applies adaptive interpolation filter set at the region level. The region may correspond to a part of picture, a coding tree unit (CU), a coding tree block (CTB), a leaf coding unit, or a prediction unit (PU). The selection of interpolation filter sets can be explicitly derived or implicitly signaled to the decoder. For the explicit signaling, a syntax element can be coded for each region to indicate the interpolation filter set selected for the current region. For the implicit signaling, the selection of interpolation filter sets can be determined according to the block size, the characteristic of reference pixels, prediction mode, information derived by the decoder, or any combination of above.

The multi-coefficient-set interpolation mentioned above can be combined with other interpolation techniques to further improve performance or reducing data access/system bandwidth requirement. For example, an overlapped block motion compensation (OBMC) technique is disclosed during the HEVC development in JCTVC-C251 (Chen, et al, "Overlapped block motion compensation in TMuC", in Joint Collaborative Team on Video Coding (JCT-VC), of ITU-T SG16 WP3 and ISO/IEC JTC1/SC29/WG11 3rd Meeting: Guangzhou, CN, 7-15 Oct. 2010, Document: JCTVC-C251), where OBMC is applied to geometry partition. Another OBMC proposal during the HEVC standard development is disclosed in JCTVC-F299 (Guo, et al, "CE2: Overlapped Block Motion Compensation for 2N×N and N×2N Motion Partitions", in Joint Collaborative Team on Video Coding (JCT-VC), of ITU-T SG16 WP3 and ISO/IEC JTC1/SC29/WG11, 6th Meeting: Torino, 14-22 Jul. 2011, Document: JCTVC-F299), where OBMC is applied to symmetrical motion partitions. According to JCTVC-F299, if a coding unit (CU) is partitioned into two 2N×N or N×2N partition units (PUs), OBMC is applied to the horizontal boundary of the two 2N×N prediction blocks, and the vertical boundary of the two N×2N prediction blocks.

Figure 4A:
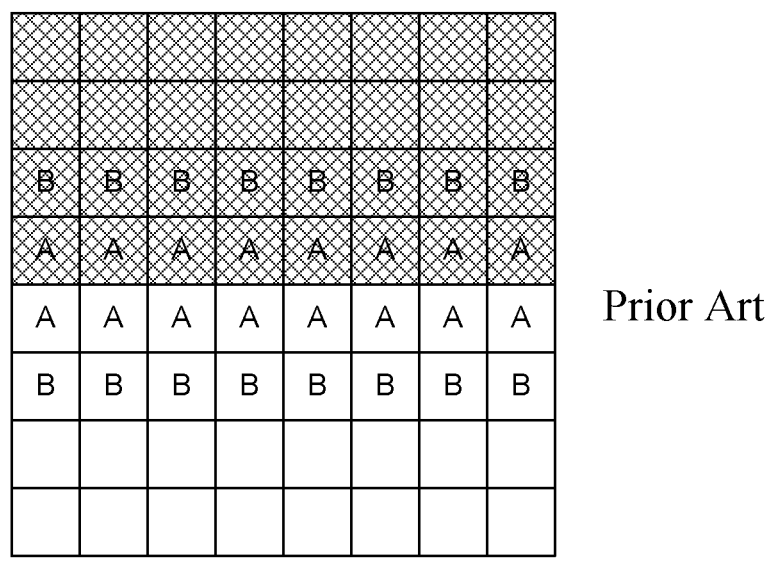
FIG. 4A illustrates exemplary Overlapped Block Motion Compensation (OBMC) for 2N×N prediction units (PUs).
Figures 4B, 5:
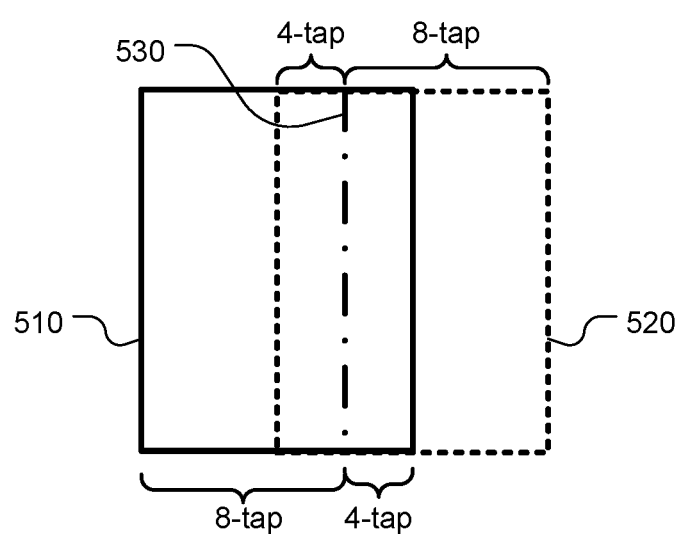
FIG. 4B illustrates exemplary Overlapped Block Motion Compensation (OBMC) for N×2N prediction units (PUs).
FIG. 5 illustrates an example of interpolation for generating interpolated reference samples in the overlapped area in overlapped block motion compensation (OBMC) according to an embodiment of the present invention.

FIGS. 4A-B illustrate exemplary OBMC for 2N×N (FIG. 4A) and N×2N blocks (FIG. 4B). The pixels in the shaded area belong to Partition 0 and the pixels in the clear area belong to Partition 1. The overlapped region in the luma component is defined as 2 rows (or columns) of pixels on each side of the horizontal (or vertical) PU boundary. For pixels that are 1 row (or column) apart from the partition boundary, i.e., pixels labeled as A in FIGS. 4A-B, OBMC weighting factors are (¾, ¼). For pixels that are 2 rows (columns) away from the partition boundary, i.e., pixels labeled as B in FIGS. 4A-B, OBMC weighting factors are (⅞, ⅛). For chroma components, the overlapped region is defined as 1 row (or column) of pixels on each side of the horizontal (or vertical) PU boundary, and the weighting factors are (¾, ¼).

In a coding system incorporating the OBMC process, the system bandwidth related data access will be increased due to additional processing required for pixels in the overlapped area. FIG. 5 illustrates an example of adaptive interpolation filter for a system with OBMC. Box 510 refers to a block on the left-hand side and box 520 refers to a block on the right-hand side. Line 530 corresponds to the original boundary between the overlapped blocks if they were not overlapped. When the left block (510) is processed, the area within the original boundary (i.e., the area to the left side of the boundary 530) can be processed using an 8-tap interpolation filter set. On the other hand, the area of block 510 overlapped with block 520 (i.e., the area within block 510 and to the right of boundary 530) can be interpolated using a 4-tap interpolation filter set. Similarly, an 8-tap interpolation filter set can be applied to the non-overlapped area for block 520 and a 4-tap interpolation filter set can be applied to the overlapped area for block 520. Due to the shorter filter used for the overlapped area, the need for additional reference samples can be reduced.

Figure 6:
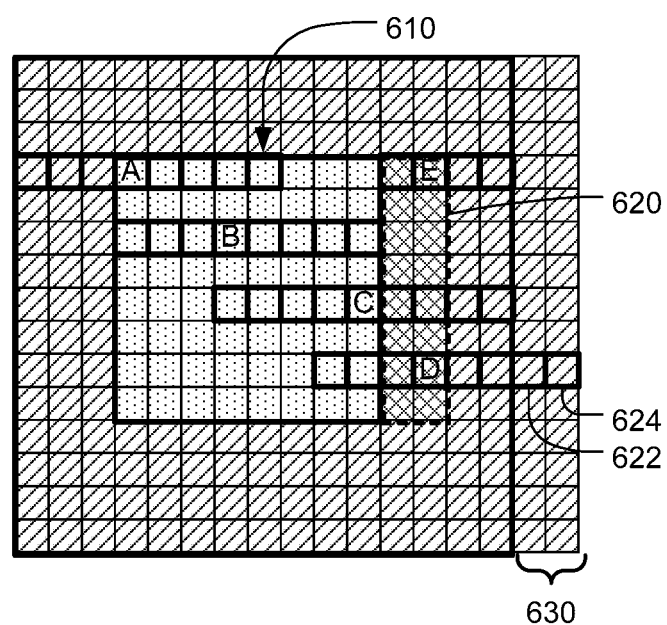
FIG. 6 illustrates an example of interpolation for generating boundary interpolated reference samples in the boundary area for motion boundary enhancement (MBE) according to an embodiment of the present invention.

In a co-pending PCT Patent Application, Serial No. PCT/CN2014/093148, filed on Dec. 5, 2014 assigned to the same assignee, a motion boundary process has been disclosed, where temporal predictors for boundary pixels of the current block are calculated according to a weighted sum of three predictors associated with three motion vectors corresponding to the current motion vector and two neighboring motion vectors. Again, the motion boundary process requires more samples processed and causes increase in system bandwidth. The adaptive interpolation filter set described above can be applied to reduce the additional bandwidth requirement. FIG. 6 illustrates an example of interpolation process for generating interpolated pixels in the boundary area. Two columns of neighboring pixels (620) adjacent to the right side of the current block (610) have to be reconstructed and interpolated for fractional motion vector. The horizontal filtering for sample D would require two additional reference samples (622 and 624) from the neighboring block. Therefore, two columns (630) of additional reference samples will be required for processing the overlapped area on the right side of the current block. The adaptive interpolation filter can be applied to reduce the additional bandwidth. For example, a 4-tap filter can be applied to the pixels (e.g., sample E) in the overlapped area to replace the 8-tap filter in the conventional approach. Therefore, the interpolation for sample E does not require any additional reference pixels beyond the reference pixels needed for the conventional system.

The present invention is not restricted to the filters in the horizontal direction. In other embodiments, the interpolation filter set may correspond to filters in the vertical direction or the slanting direction.

Figure 7:
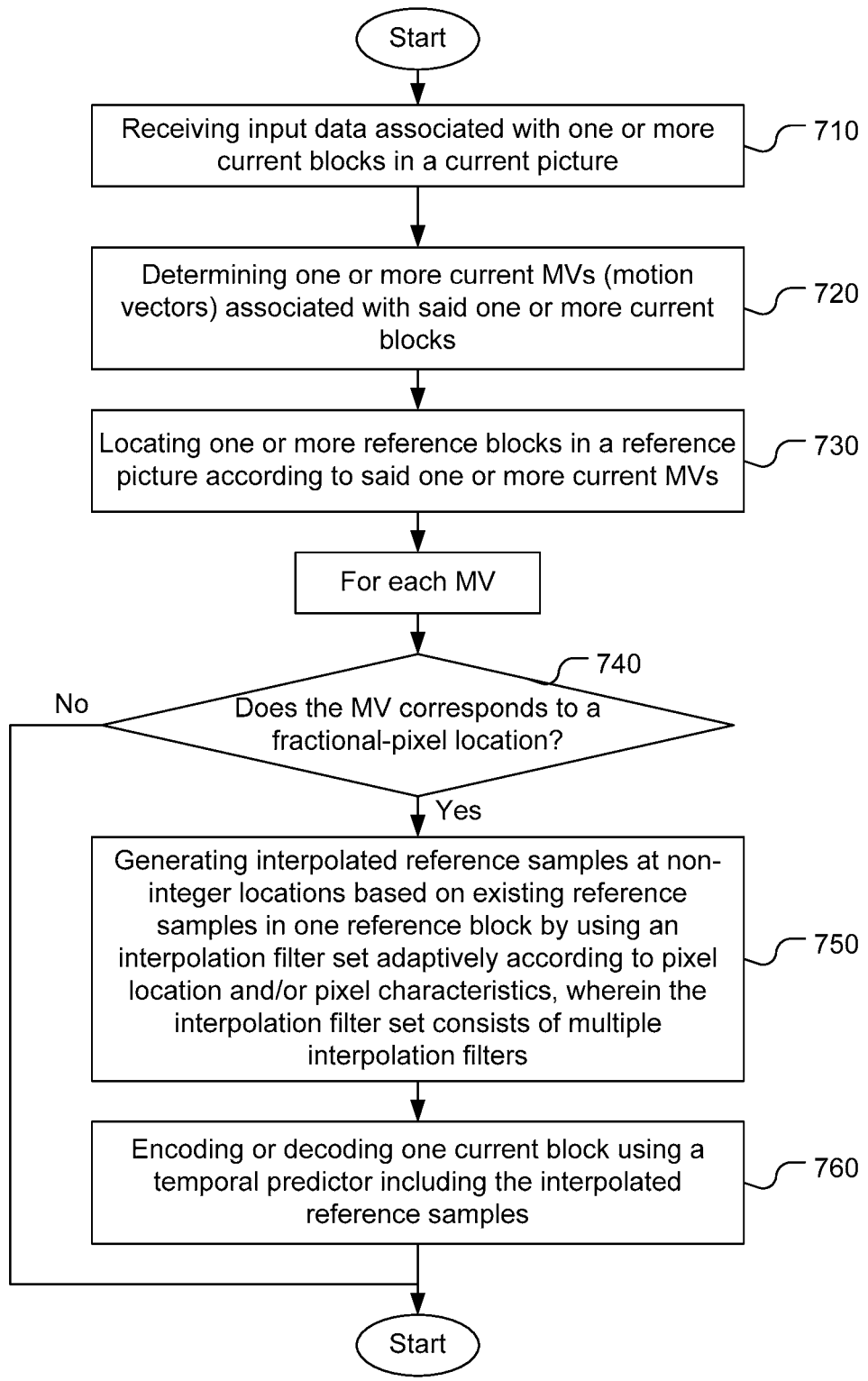
FIG. 7 illustrates an exemplary flowchart of adaptive interpolation filter incorporating an embodiment according to the present invention, where an interpolation filter set is applied adaptively to a block based on pixel location and/or pixel characteristics.

FIG. 7 illustrates an exemplary flowchart of adaptive interpolation filter according to one embodiment of the present invention. The system receives input data associated with one or more current blocks in a current picture as shown in step 710. The current blocks may be retrieved from memory (e.g., computer memory, buffer (RAM or DRAM) or other media) or from a processor. One or more current MVs (motion vectors) associated with said one or more current blocks are determined in step 720. One or more reference blocks in a reference picture are located according to said one or more current MVs in step 730. For each of said one or more current MVs, a test is regarding whether the current MV corresponds to a fractional-pixel location in step 740. If the result is "Yes", steps 750 and 760 are performed. If the step is "No", steps 750 and 760 are skipped. In step 750, interpolated reference samples at non-integer locations are generated based on existing reference samples in the reference block by using an interpolation filter set adaptively according to pixel location and/or pixel characteristics. The interpolation filter set consists of multiple interpolation filters. The current block is then encoded or decoded using a temporal predictor including the interpolated reference samples. When the motion vector corresponds to an inter-pixel location, there is no need to generate interpolated reference samples at fractional-pixel locations. The reference samples at integer-pixel locations can be used as a temporal predictor without interpolation process.

The flowchart shown above is intended to illustrate an example of adaptive interpolation filter according to embodiments of the present invention. A person skilled in the art may modify each step, re-arranges the steps, split a step, or combine steps to practice the present invention without departing from the spirit of the present invention The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention may correspond to one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding in a video coding system, the method comprising:
   receiving input data associated with a current block in a current picture;
   determining a current motion vector (MV) associated with the current block, the current MV indicating fractional-pixel locations in a reference picture for perform motion compensation on the current block;
   locating a reference block in the reference picture according to the current MV;
   identifying a prediction mode of the current block;
   generating interpolated reference samples at the respective fractional-pixel locations, from reference pixels of the reference block based on at least a first interpolation filter set and a second interpolation filter set, selection of a current interpolation filter set for a current one of the interpolated reference samples from multiple interpolation filter sets being based on information associated with one or a combination of a location of the current one of the interpolated reference samples, the prediction mode of the current block, a size of the current block, an accuracy of the current MV, and a characteristic of the reference pixels of the reference block, and the first interpolation filter set and the second interpolation filter set corresponding to different filter tap lengths; and
   encoding or decoding the current block using a predictor including the interpolated reference samples.

2. The method of claim 1, wherein the current block is associated with one of multiple regions partitioned from the current picture, and the information is explicitly signaled or implicitly derived for each of the multiple regions.

3. The method of claim 2, wherein each region corresponds to one slice, one tile, one coding tree unit (CTU), one coding tree block (CTB), one coding unit (CU) or one prediction unit (PU).

4. The method of claim 1, wherein the multiple interpolation filter sets correspond to different filter tap lengths.

5. The method of claim 1, wherein said multiple interpolation filter sets comprises an 8-tap interpolation filter set and a 6-Tap interpolation filter set.

6. The method of claim 1, wherein said multiple interpolation filter sets comprises an 8-tap interpolation filter set, a 6-Tap interpolation filter set and a 4-tap interpolation filter set.

7. An apparatus of video coding in a video coding system, the apparatus comprising one or more electronic circuits configured to:
   receive input data associated with a current block in a current picture;
   determine a current motion vector (MV) associated with the current block, the current MV indicating fractional-pixel locations in a reference picture for perform motion compensation on the current block;
   locate a reference block in the reference picture according to the current MV;
   identify a prediction mode of the current block;
   generate interpolated reference samples at respective fractional-pixel locations from reference pixels of the reference block based on at least a first interpolation filter set and a second interpolation filter set, selection of a current interpolation filter set for a current one of the interpolated reference samples from multiple interpolation filter sets being based on information associated with one or a combination of a location of the current one of the interpolated reference samples, the prediction mode of the current block, a size of the current block, an accuracy of the current MV, and a characteristic of the reference pixels of the reference block, and the first interpolation filter set and the second interpolation filter set corresponding to different filter tap lengths;
   encode or decode the current block using a predictor including the interpolated reference samples.

8. The apparatus of claim 7, wherein the current block is associated with one of multiple regions partitioned from the current picture, and the information is explicitly signaled or implicitly derived for each of the multiple regions.

9. The apparatus of claim 8, wherein each region corresponds to one slice, one tile, one coding tree unit (CTU), one coding tree block (CTB), one coding unit (CU) or one prediction unit (PU).

10. The apparatus of claim 7, wherein the multiple interpolation filter sets correspond to different filter tap lengths.

11. The apparatus of claim 7, wherein said multiple interpolation filter sets comprises an 8-tap interpolation filter set and a 6-Tap interpolation filter set.

12. The apparatus of claim 7, wherein said multiple interpolation filter sets comprises an 8 tap interpolation filter set, a 6-Tap interpolation filter set and a 4-tap interpolation filter set.

* * * * *